United States Patent Office 3,647,827
Patented Mar. 7, 1972

3,647,827
REACTIVE PHTHALOCYANATE DYES CONTAINING AN ARYLUREAMETHYLENE GROUP
Hiroshi Sigiyama, Ashiya-shi, Takuo Ikeda, Ibaragi-shi, and Takashi Itani, Sakai-shi, Japan, assignors to Sumitomo Chemical Company, Ltd., Osaka, Japan
No Drawing. Filed Dec. 8, 1967, Ser. No. 688,959
Claims priority, application Japan, Dec. 10, 1966, 41/81,194
Int. Cl. C09b 1/30, 62/72; D06p 1/38
U.S. Cl. 260—372
2 Claims

ABSTRACT OF THE DISCLOSURE

A dye suitable for dyeing cellulosic materials such as cotton, nitrogen-containing fibers such as wool and polyvinyl alcohol fibers, which has the formula,

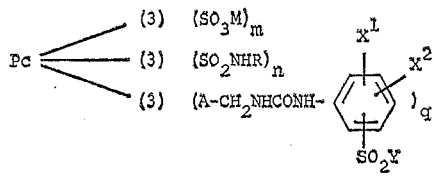

wherein Pc is a copper or nickel phthalocyanine nucleus; $X^1$ and $X^2$ each represent hydrogen, methyl or methoxy; M is hydrogen, an alkali metal or an alkaline earth metal; Y is —$CH_2CH_2OSO_3M$ or —$CH=CH_2$ and the —$SO_2Y$ group is bonded with the phenyl group at a 3- or 4-position to the ureido group; R is hydrogen or

—$CH_2CH_2OSO_3M$

A is —$SO_2NH$— or

($R^1$ and $R^2$ each represent hydrogen, sulfo or methyl); $m$ is 0 to 3; $n$ is 0 to 2; and $q$ is 1 to 4, wherein $m+n+q$ is 3 or 4, and when $q$ is 2 to 4, the A's may be the same or different, and —$SO_3M$, —$SO_2NHR$ and —A— groups are all bonded to four phenyl nucleuses in said phthalocyanine at a 3-position, respectively.

The present invention relates to novel dyes, processes for producing the same and dyeing processes. More particularly, it concerns novel dyes represented by the formula:

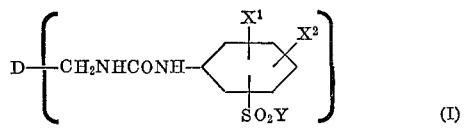

wherein D is a dye residue; $X^1$ and $X^2$ are respectively hydrogen, lower alkyl group, lower alkoxy group, halogen, sulfonic acid group or carboxylic acid group; Y is —$CH_2$—$CH_2OSO_3M_m$, wherein M is hydrogen, ammonium, alkali metal or alkaline earth metal and $m$ is 1 or ½, —$CH_2CH_2Cl$ or —$CH=CH_2$ and $n$ is an integer of 1 to 4 inclusive.

It is well known that dyes having

—$SO_2CH_2CH_2OSO_3H$, —$SO_2CH_2CH_2Cl$ or —$SO_2CH=CH_2$ group are useful as reactive dyes for dyeing fibrous materials. The present inventors have found that the present dyes having the Formula I mentioned above have superior fastness, colour brightness and fixation. It is the present inventors who first found these characteristics of the present dyes.

The object of the present invention is to provide novel reactive dyes which are useful for dyeing fibrous materials. Another object of the present invention is to provide a process for producing the above-mentioned novel reactive dyes. Further the object of the present invention is to provide a process for dyeing fibrous materials with the above-mentioned dyes. Furthermore the object of the present invention is to provide novel reactive compounds and a process for production thereof. And other objects of the present invention will be made clear by the following text.

The fibrous materials in the present invention include cellulosic materials such as cotton, linen, viscose rayon and staple fibers of regenerated cellulose, nitrogen-containing fibers such as wool and polyamides and polyvinyl alcohol fibers.

The dyes of the present invention are novel and the present dye residues are of azo dyes, metal-containing azo dyes, anthraquinone dyes, phthalocyanine dyes, diphenylamine dyes, oxazine dyes, formazyl dyes or xanthene dyes, among which water-soluble azo dyes, metal-containing azo dyes, anthraquinone dyes and phthalocyanine dyes are especially preferable.

The present dyes are prepared by (a) reacting dye residue mentioned above and having one or more active hydrogens with a compound represented by the formula,

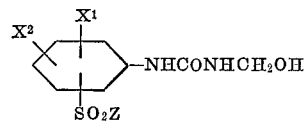

wherein $X^1$ and $X^2$ are the same as defined above and Z is the same as Y or —$CH_2CH_2OH$ group, in an appropriate ratio, in sulfuric acid, or (b) reacting a dye residue mentioned above and having one or more active hydrogens with a compound represented by the formula,

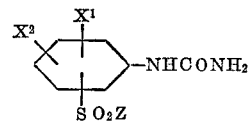

wherein $X^1$, $X^2$ and Z are the same as defined above, together with Formalin, paraformaldehyde or dichlorodimethyl ether in sulfuric acid. In both cases the reaction is conducted in 80–100% sulfuric acid or in low concentration fuming sulfuric acid for several hours. One to five mole of the compound (II) or (III) is, preferably, employed per one mol. of the dye residue. When concentrated sulfuric acid is used in the above reaction, the compound (I) where Y is —$CH_2CH_2OSO_3H$ is directly obtained from the compound (II) or (III) where Z is —$CH_2CH_2OH$. Compound (I) where Y is —$CH=CH_2$ is obtained by further treating the compound (I) where Y is —$CH_2CH_2OSO_3M_m$ wherein M is hydrogen, ammonium, alkali metal or alkaline earth metal and $m$ is 1 or ½, or —$CH_2CH_2Cl$ with acid-binding agents. In such dye synthesis, active hydrogen atom in the dye residues is removed due to dehydration or dehydrochlorination, and then methylene group is bound directly to the aryl nucleus or substituted for the end amino group, as in the Formula I. The active hydrogen of the dye residues is on phenyl nucleus which constitutes a portion of dye structure, particularly, on such nucleus having alkyl, alkoxy or phenoxy group; or on sulfonamide, carbamide, aminotriazynyl or urea group. When the dye residues are particularly of azo dyes, the introduction of such reactive groups can be effected in the intermediate stage.

In this case, the adducts can be derived to the present dyes by such a manner as, for example, diazotizing, coupling, metallisation and condensation.

The compounds represented by the Formulae II and III are novel compounds. The compounds represented by Formula III are prepared, for example, by reacting compounds represented by the formula,

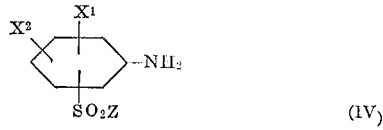

(IV)

wherein $X^1$, $X^2$ and Z are the same as defined above, with potassium or sodium cyanate or urea in a high yield according to the method described in Organic Synthesis, vol. 31, page 8 (1951), and further the compounds represented by the Formula II are prepared in a high yield by a conventional atmospheric hydroxymethylation of the compounds (III), for example, by reacting the compounds (III) with formaldehyde in a neutral or weakly alkaline aqueous solution at 30°–40° C.

The typical examples of the compounds represented by Formula II or III are shown in the following Table 1. In the Table 1, kinds and positions of the substituents $-SO_2Z$, $X^1$ and $X^2$ are shown on the assumption that the urea group or methylolated urea group is substituted at 1 position of the benzene nucleus.

TABLE I

| $-SO_2Z$ | $X^1$ | $X^2$ |
|---|---|---|
| 3-$SO_2Z$ | H | H |
| 4-$SO_2Z$ | H | H |
| 3-$SO_2Z$ | 6-$OCH_3$ | H |
| 3-$SO_2Z$ | 6-$CH_3$ | H |
| 3-$SO_2Z$ | 6-COOH | H |
| 3-$SO_2Z$ | 6-$SO_3H$ | H |
| 3-$SO_2Z$ | 6-Cl | H |
| 3-$SO_2Z$ | 4-$OCH_3$ | H |
| 3-$SO_2Z$ | 4-$OCH_3$ | 6-$OCH_3$ |
| 4-$SO_2Z$ | 6-COOH | H |
| 4-$SO_2Z$ | 3-$CH_3$ | H |
| 4-$SO_2Z$ | 3-$CH_3$ | 6-$CH_3$ |
| 4-$SO_2Z$ | 3-$CH_3$ | 6-$OCH_3$ |
| 4-$SO_2Z$ | 3-$OCH_3$ | 6-$OCH_3$ |
| 4-$SO_2Z$ | 3-$OC_2H_5$ | 6-$OC_2H_5$ |

Various dyeing processes may be applied, in wide range, such as a conventional dip dyeing, printing, padding etc.

Dip dyeing of cellulosic textile fiber is operated by adding an inorganic salt such as sodium chloride, sodium sulfate, etc. into a dyebath in the presence of an acid-binding agent such as sodium hydrogen carbonate, sodium carbonate, sodium hydroxide, sodium phosphate, etc., at relatively low temperature.

In padding method the material to be dyed is padded in an aqueous solution containing the dye. At the same time of or after the application, steaming or heat-treating is effected at relatively high temperature such as 70°–180° C., in the presence of an acid-binding agent such as sodium hydrogen carbonate, sodium carbonate, sodium hydroxide, sodium phosphate, sodium silicate, etc. Alternatively, fibers having been padded by a solution containing the dyestuff only may be treated at relatively high temperature, such as 80°—100° C., in a bath containing the acid-binding agents.

Further alternatively, boiling-treatment in a water bath containing a great quantity of inorganic salt may be effective instead of steaming or heat-treating. In case sodium silicate is used as an acid-binding agent, it is not always necessary to conduct the treatment at such a high temperature as above mentioned, and satisfactory dyeing is obtained even at a relatively low temperature such as 20°–70° C.

Printing process can be operated by printing, onto fiber, a paste which can be obtained by adding dye and the above-mentioned acid-binding agent to thickening agent such as alkyl-cellulose, sodium alginate etc., and if necessary, followed by steaming or heat-treatment at 70°–180° C., or by printing with printing paste without containing an acid-binding agent and treating the printed fiber in a bath containing the above-mentioned acid-binding agent, or by printing a printing paste without containing an acid-binding agent, and printing a paste containing an acid binding agent onto the printed fiber and then, if necessary, followed by steaming or heat-treatment. In this manner, it is also possible to resist dyeing by using an acid.

The dyeing of nitrogen-containing fiber can be operated in a neutral to weakly acidic dyeing bath by a conventional method, and in this case, more preferably a nitrogen-containing nonionic surface active agent or cationic surface active agent may be added as a dyeing agent, and after dyeing the dyeing bath may be subjected to neutralization with a weak alkali such as hexamethylentetramine.

After dyeing, it is preferable to remove dyes, which are not bound to fiber, with soaping treatment or washing with water. Dyed materials thus obtained have remarkably excellent various fastness.

The dyes represented by the Formula I are novel and, in practice, the dye residues are of all kinds of dyes and even a non-colored compound may be employed as a dye residue, and in this case, it is possible to color a fiber in such a manner as diazo-coupling after dyeing on the fiber.

Preferred dyes of the present invention which are of the phthalocyanine type may be represented by the following formula,

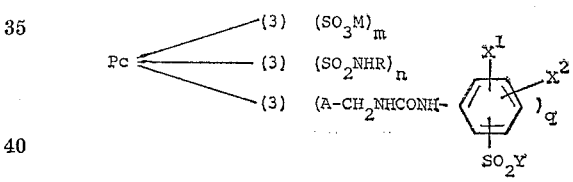

wherein Pc is a copper or nickel phthalocyanine nucleus; $X^1$ and $X^2$ each represent hydrogen, methyl or methoxy; M is hydrogen, an alkali metal or an alkaline earth metal; Y is $-CH_2CH_2OSO_3M$ or $-CH=CH_2$ and the $-SO_2Y$ group is bonded with the phenyl group at a 3 - or 4 -position to the ureido group; R is hydrogen or $-CH_2CH_2OSO_3M$ A is 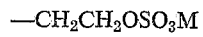 or

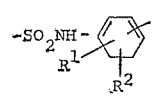

($R^1$ and $R^2$ each represent hydrogen, sulfo or methyl); $m$ is 0 to 3; $n$ is 0 to 2; and $q$ is 1 to 4, wherein $m+n+q$ is 3 or 4, and when $q$ is 2 to 4, the A's may be the same or different, and $-SO_3M$, $-SO_2NHR$ and $-A-$ groups are all bonded to four phenyl nucleuses in said phthalocyanine at a 3-position, respectively.

The following examples are given to illustrate the present invention, but it is needless to say that the present invention is not limited to them: All parts are based on weight.

EXAMPLE 1

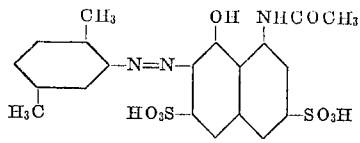

3 parts of a dye represented by the above-identified structural formula was dissolved in 24 parts of 98% sulfuric acid at a temperature of less than 10° C., to which was added 4 parts of the methylol urea represented by the following structural formula:

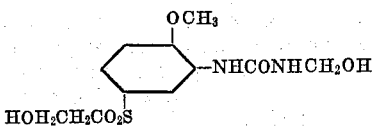

The mixture was stirred at 20° C. for 20 hours, and 5 parts of 28% fuming sulfuric acid was added thereto with stirring for 1 hour. The mixture was then poured in 50 parts of ice water and the precipitated dye was filtered to obtain a cake thereof. The thus obtained cake was poured in water and the resultant solution was neutralized with soda ash to adjust the pH thereof to 6–7. The solution was subjected to salting out with addition of potassium chloride in an amount corresponding to 10 g./100 ml., and was then filtered and dried. As a result, 2.1 parts of a bluish red dye represented by the following structural formula was obtained.

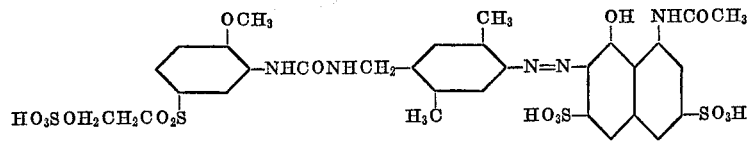

EXAMPLE 2

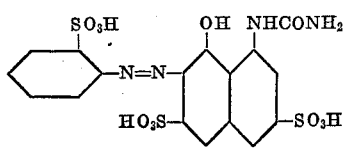

3 parts of a dye represented by the above-identified structural formula and 3 parts of a methylolurea compound represented by the following structural formula:

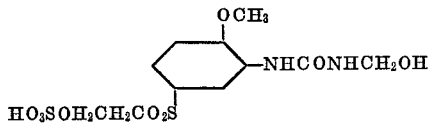

were added to 20 parts of 98% sulfuric acid at a temperature of less than 10° C. and the solution was stirred at 20°–25° C. for 20 hours. The solution was then poured in 40 parts of ice water and the precipitated dye was filtered to obtain a cake thereof. The cake was poured in water and the resultant solution was neutralized with soda ash to adjust the pH thereof to 6–7. The solution was subjected to salting out with addition thereto of sodium chloride in an amount corresponding to 10 g./100 ml. and was filtered and dried. As a result, 4.5 parts of a clear bluish red dye represented by the following structural formula was obtained.

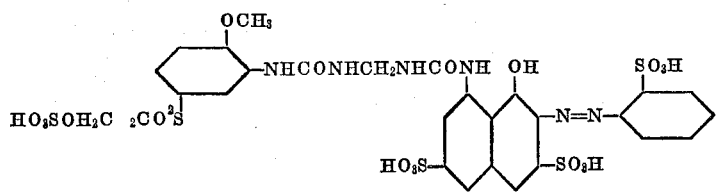

The same treatment as above was repeated except that the solution was neutralized with soda ash to adjust the pH thereof to 8.0–8.5 and was stirred at 40° C. for 1 hour to obtain a dye represented by the following structural formula:

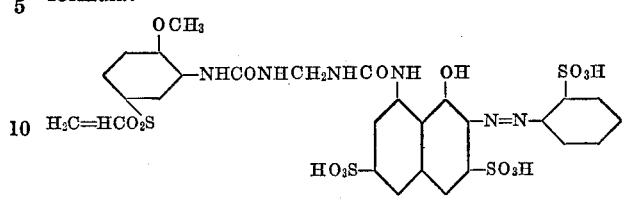

EXAMPLE 3

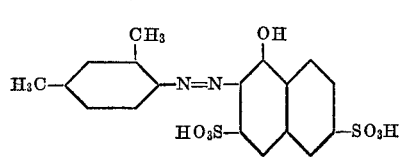

3 parts of a dye represented by the above-identified structural formula and 3 parts of a methylolurea compound represented by the following structural formula:

were added to 25 parts of 100% sulfuric acid at a temperature of less than 15° C. and the mixture was stirred at 20°–25° C. for 20 hours. The mixture was poured in ice water. After diluting, the solution was neutralized with addition thereto of calcium sulfate and filtered. The calcium sulfate was thoroughly rinsed and was evaporated together with the filtrate at a temperature of less than 70° C. to obtain a dried solid.

As a result, 5.5 parts of a clear bluish red dye represented by the following structural formula was obtained.

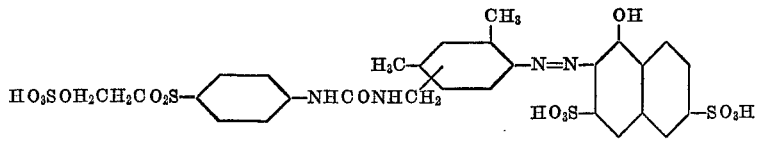

When the same treatment as above was repeated except that 2.5 parts of a urea compound represented by the following structural formula:

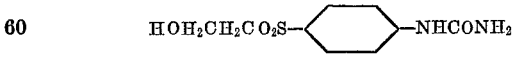

and 1 part of a performaldehyde were used in place of the aforesaid methylolurea compound, the same dye as above was obtained.

EXAMPLE 4

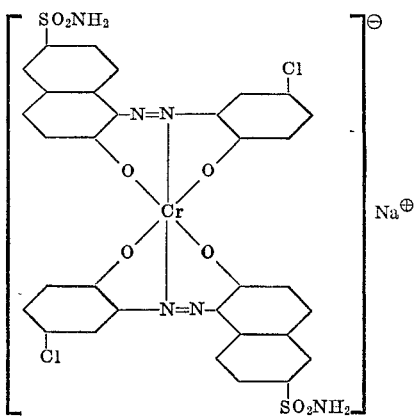

5 parts of a dye represented by the above-identified structural formula and 2 parts of a urea compound represented by the following structural formula:

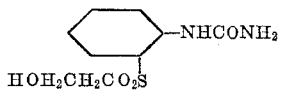

and 1 part of paraformaldehyde were added to 60 parts of 100% sulfuric acid. The same treatment as in Example 3 was then repeated to obtain a purple dye represented by the following structural formula:

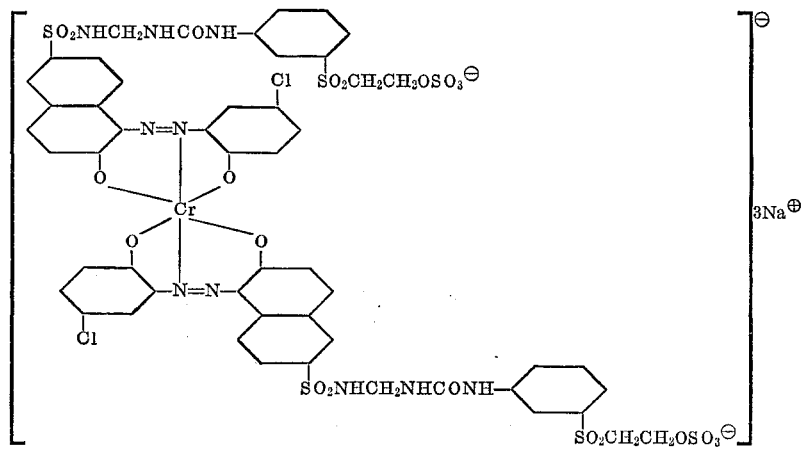

In this example, when 3 parts of 30% aqueous Formalin was used in place of the paraformaldehyde, the same result as above was obtained.

EXAMPLE 5

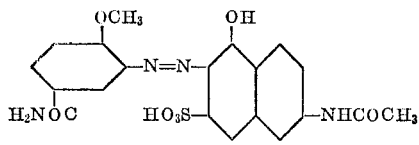

3 parts of a dye represented by the above-identified structural formula and 3 parts of the methylolurea compound used in Example 2 were dissolved in 20 parts of 98% sulfuric acid, and the mixture was stirred at 20°–25° C. for 15 hours. The mixture was poured in 40 parts of ice water, the precipitated dye was filtered. The resulting cake was poured in 30 parts of water and was neutralized with soda ash to adjust the pH thereof to 4–5. 2 parts of crystalline copper sulphate and 1 part of crystalline sodium acetate were added thereto, and the mixture was heated to 90° C. for 6 hours. The mixture was subjected to salting out with addition thereto of 4.5 parts of sodium chloride, filtered and dried. As a result, a dye capable of dyeing cotton to bordeaux shade with good fastness was obtained.

EXAMPLE 6

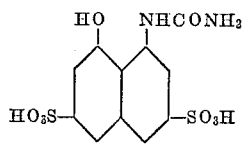

2 parts of a compound represented by the above-identified structural formula and 2 parts of the methylolurea compound used in Example 1 were dissolved in 10 parts of 100% sulfuric acid at a temperature of less than 10° C., and the mixture was stirred at 20°–25° C. for 15 hours. The mixture was then poured in 20 parts of ice water and was neutralized with addition thereto of soda ash to adjust the pH thereof to 6–7. Subsequently, coupling was effected by adding thereto a diazo solution obtained by diazotizing 0.9 part of o-aniline sulfonic acid according to usual method, and the resultant solution was subjected to salting out with addition thereto of sodium chloride in an amount corresponding to 10 g./100 ml., filtered and dried. As a result, the same dye as that obtained in Example 2 was obtained.

The dyes indicated in (A) in the following Table 2 and the methylolurea or urea compounds indicated in (B) were used as the starting materials provided that in case of using the urea compounds, paraformaldehyde or Formalin was used together. The same treatments as in Examples 1–6 were carried out respectively to effect the reaction in sulfuric acid to obtain the dyes capable of dyeing cotton in the shade indicated in (C) and with good fastnesses.

TABLE 2

| Example No. | (A) | (B) | (C) |
|---|---|---|---|
| 7 | [structure with SO₃H, OH, NHCO-C₆H₄-CH₃, N=N, SO₃H, HO₃S] | H₂NCONH-C₆H₄-SO₂CH₂CH₂OH | Bluish red. |
| 8 | [structure with H₃C-C₆H₄-O-C₆H₄, N=N, SO₃H, OH, H₃COCHN, HO₃S] | HOH₂CNHCONH-C₆H₄-SO₂CH₂CH₂Cl | Do. |
| 9 | [structure with SO₃H, OH, NHCO-C₆H₄-CH₃, N=N, SO₃H, HO₃S] | HOH₂CNHCONH-C₆H₄(OCH₃)-SO₂CH₂CH₂OH | Do. |
| 10 | [pyrazolone structure with COOH, N=N, CH₃, N, CH₃, C₆H₄-CH₃] | HOH₂CNHCONH-C₆H₄-SO₂CH=CH₂ | Yellow. |
| 11 | [structure with SO₃H-C₆H₄-N=N-CHCONH-COCH₃, CH₃, C₆H₄-CH₃, HO₃S] | H₂NCONH-C₆H�3(CH₃)-SO₂CH₂CH₂OH | Do. |
| 12 | [structure with HO₃S, OH, N=N, H₃C, C₆H₄-CH₃, HO₃S] | H₂NCONH-C₆H₃(OCH₃)(CH₃)-SO₂CH₂CH₂OH | Orange. |

TABLE 2—Continued

| | (A) | (B) | (C) |
|---|---|---|---|
| 13 | [naphthalene-OH, OCH₃, SO₃H linked via N=N to benzene with SO₃H, CONH₂] | [benzene with OCH₃ and SO₂CH₂CH₂OH, HOH₂CNHCONH–] | Bright red. |
| 14 | [naphthalene-OH, NHCONH₂, SO₃H linked via N=N to benzene with SO₃H, HO₃S] | [benzene with SO₃H and SOCH₂CH₂OH, HOH₂CNHCONH–] | Red. |
| 15 | [Cu-complex azo dye with NHCO-tolyl group, HO₃S] | [benzene with COOH and SO₂CH₂CH₂OH, H₂NCONH–] | Purplish red. |
| 16 | [Cr-complex (H₂O)₂ azo dye with NHCO-tolyl, NO₂, HO₃S] | [benzene with SO₂CH₂CH₂OH, HOH₂CNHCONH–] | Bluish grey. |
| 17 | [Cr-complex sodium salt with pyrazolone/tolyl and SO₂NHC₂H₅ groups, Na⁺] | [benzene with Cl and SO₂CH₂CH₂Cl, HOH₂CNHCONH–] | Yellow. |

TABLE 2—Continued

| | (A) | (B) | (C) |
|---|---|---|---|
| 18 | [Cr complex dye structure with two azo ligands bearing CH₃, NHCOCH₃, NO₂ substituents, Na⁺ counterion] | HOH₂CNHCONH—⟨benzene with OCH₃⟩—SO₂CH₂CH₂OH | Brown. |
| 19 | [Cu complex azo dye with HO₃S, CH₃, NH-tolyl groups] | NH₂CONH—⟨benzene⟩—SO₂CH₂CH₂OH | Greenish gray. |
| 20 | [Cu complex azo dye with OH, CH₃ substituents] | HOH₂CNHCONH—⟨benzene with SO₃H⟩—SO₂CH₂CH₂OH | Yellowish brown. |
| 21 | [Triazine-linked azo dye with C-NH₂, HO₃S, OH NH substituents] | HOH₂CNHCONH—⟨benzene⟩—SO₂CH₂CH₂OH | Red. |

EXAMPLE 22

9.4 parts of copper phthalocyanine-(3)-sulfo-(3)-disulfonamide - (3) - sulfo - N - (β - hydroxyethyl)amide was dissolved in 94 parts of 100% sulfuric acid. To the resulting solution, was added 5.5 parts of N-[3-(β-hydroxyethylsulfonyl) - 6 - methoxyphenyl] - N'' - methylolurea, and the resultant solution was stirred at 20° C. for 3 hours. The reaction mixture was then poured in 600 parts of ice water containing 60 parts of potassium chloride, and the resulting precipitate was separated by filtration to obtain a wet cake. The wet cake was then suspended in 150 parts of a 10% aqueous potassium chloride solution. The resultant solution was subject to neutralization with soda ash to adjust the pH of the solution to 6-7 and was then filtered to obtain a reddish turquoise blue dye represented by the following structural formula:

addition of soda ash and was then filtered to obtain a turquoise blue dye represented by the following structural formula:

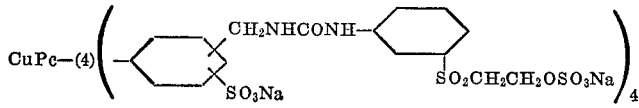

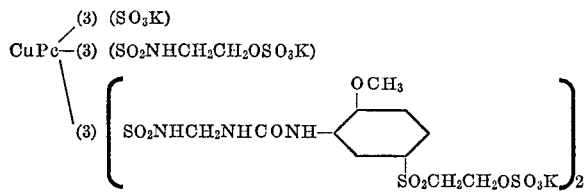

EXAMPLE 23

8.9 parts of copper phthalocyanine-(3)-sulfo-(3)-trisulfonamide was dissolved in 89 parts of 100% sulfuric acid. To the resulting solution, were added 7.5 parts of N - [4 - (β - hydroxyethylsulfonyl) - 6 - methoxy - 3- methylphenyl] urea and 3.0 parts of a 30% aqueous formalin solution, and the resultant solution was stirred at 15°–20° C. for 10 hours. The reaction mixture was then poured in 500 parts of ice water containing 50 parts of sodium chloride, and the resulting precipitate was separated by filtration to obtain a wet cake. The wet cake was then suspended in 150 parts of a 15% aqueous sodium chloride solution. The resultant solution was subjected to neutralization with soda ash to adjust the pH of the solution to 6-7, and was then filtered to obtain a reddish turquoise blue dye represented by the following structural formula:

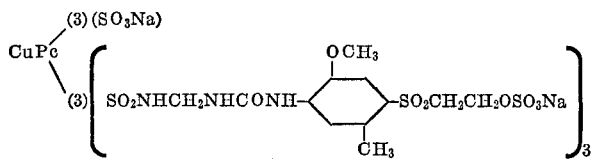

EXAMPLE 24

11.2 parts of copper phthalocyanine-(3)-sulfo-(3)-trisulfo-N-phenylamide was dissolved in 67 parts of 90% sulfuric acid. To the resulting solution, were added 4.3 parts of N-[4-(β-hydroxy-ethylsulfonyl)phenyl] urea and 0.6 part of paraformaldehyde, and the resultant solution was allowed to react at 20°–25° C. for 5 hours, to which 50 parts of a 65% fuming sulfuric acid was added dropwise while being cooled to a temperature of less than 10° C. The solution was stirred at 10° C. for 1 hour to effect sulfonation.

The reaction mixture was poured in 700 parts of ice water containing 70 parts of sodium chloride, and the resulting precipitate was separated by filtration to obtain a wet cake. The wet cake was then suspended in 150 parts of a 20% aqueous sodium chloride solution, and the solution was neutralized with soda ash to adjust the pH of the solution to 9. The solution was stirred for 1 hour while maintaining the pH of the solution at 9 with

EXAMPLE 25

8.8 parts of tetraphenyl copper phthalocyanine was dissolved in 53 parts of 70% sulfuric acid. To the resulting solution, were added 4.3 parts of N-[3-(β-hydroxyethylsulfonyl)phenyl] urea and 0.6 part of paraformaldehyde, and reaction was effected at 15°–20° C. for 10 hours, to which 40 parts of 65% fuming sulfuric acid was then added dropwise while being cooled to a temperature of less than 10° C. The solution was stirred at 10° C. for 1 hour to effect sulfonation. The reaction mixture was poured in 600 parts of ice water containing 60 parts of sodium chloride, and the resulting precipitate was separated by filtration to obtain a wet cake. The wet cake was then suspended in 150 parts of 15% aqueous sodium chloride solution, and the solution was neutralized with soda ash to adjust the pH of the solution to 6–7. The solution was then filtered to obtain a green dye represented by the following structural formula:

$$CuPc-(4)\left(-\underset{SO_3Na}{\underset{|}{\bigcirc}}\underset{}{\overset{CH_2NHCONH-\bigcirc-SO_2CH_2CH_2OSO_3Na}{}}\right)_4$$

EXAMPLE 26

When the exactly same treatment as in Example 22 was repeated except that 9.4 parts of nickel phthalocyanine - (3) - sulfo - 3 - sulfonamide - 3 - sulfo - N - (β-hydroxyethyl)amide was used in place of 9.4 parts of the copper phthalocyanine - (3) - sulfo - (3) - disulfonamide - (3) - N - (β - hydroxyethyl)amide, a dye having a bluish green color shade was obtained.

EXAMPLE 27

When the same treatment as in Example 24 was repeated except that 10.4 parts of copper phthalocyanine-(3) - sulfo - (3) - sulfonamide - (3) - disulfo - N-phenylamide was used in place of 11.2 parts of the copper phthalocyanine - (3) - sulfo - (3) - trisulfo - N - phenylamide, a dye having a turkish blue color shade was obtained.

EXAMPLE 28

4.4 parts of 1 - amino - 4(2',4',6' - trimethylphenylamino)-anthraquinone-2-sulfonicacid was dissolved in 40 parts of concentrated sulfuric acid. To the resulting solution, was added 2.8 parts of N-[3-(β-hydroxyethylsulfonyl)-6-methoxyphenyl]-N-methylolurea, and the resulting mixture was stirred at 20° C. for 3 hours. The reaction mixture was then poured in 200 parts of ice water containing 20 parts of sodium chloride, and the resulting precipitate was separated by filtration to obtain a wet cake. The wet cake was then suspended in 100 parts of 15% aqueous sodium chloride solution, the solution was neutralized with soda ash to adjust the pH of the solution to 6–7 and was then filtered to obtain a reddish blue dye represented by the following structural formula:

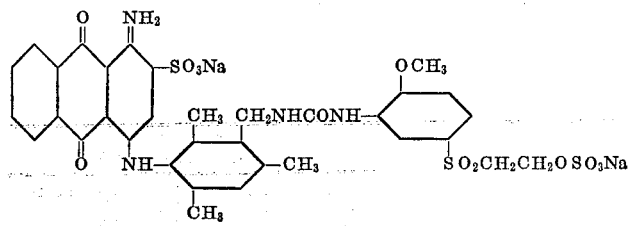

EXAMPLE 29

4.3 parts of sodium 1,4-diamino-2-phenoxyanthraquinone-3-sulfonate was dissolved in 40 parts of 90% sulfuric acid at a temperature of less than 10° C. To the resulting solution, was added 2.5 parts of N-[4-β-(hydroxyethylsulfonyl)-phenyl]-N'-methylolurea, and the reaction was effected at 10°–15° C. for 3 hours, to which 35 parts of 65% fuming sulfuric acid was added dropwise while being cooled to a temperature of less than 10° C. The resultant solution was stirred for 1 hour to effect sulfonation. The reaction mixture was poured in 400 parts of ice water containing 40 parts of potassium chloride, the resulting precipitate was separated to obtain a wet cake.

of ice water containing 20 parts of sodium chloride, and the resulting precipitate was separated by filtration, and then the precipitate was washed with a 10% aqueous sodium chloride solution until the filtrate becomes nearly neutral and was dried at a low temperature. The resulting dried cake was dissolved in 60 parts of 10% fuming sulfuric acid, and the solution was stirred at 10°–15° C. for 2 hours. The reaction mixture was then poured in 200 parts of ice water containing 30 parts of potassium chloride, and the resulting precipitate was separated by filtration to obtain a wet cake. The wet cake was suspended in 100 parts of a 15% aqueous potassium chloride solution, the solution was neutralized with soda ash to adjust the pH of the solution to 6–7, and was then filtered to obtain a sky blue dye represented by the following structural formula:

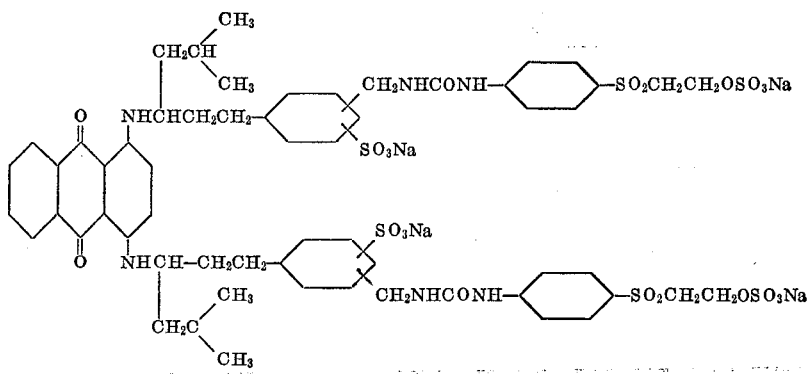

The wet cake was then suspended in 100 parts of a 15% aqueous sodium chloride solution, the resultant solution was neutralized with soda ash to adjust the pH of the solution to 6–7, and was then filtered to obtain a bluish violet dye represented by the following structural formula:

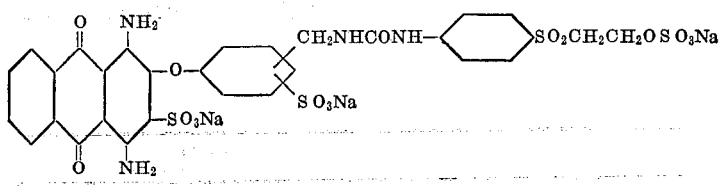

EXAMPLE 30

5.8 parts of 1,4-bis[(α-isobutyl-γ-phenyl)propylamino]-anthraquinone was dissolved in 50 parts of 90% conc. sulfuric acid at a temperature of less than 10° C. To the resulting solution, was added 43 parts of N-[4-β-(hydroxyethylsulphonyl)phenyl]urea and 0.6 part of paraformaldehyde, and the reaction was effected at 15°–20° C. for 10 hours. The reaction mixture was then poured in 300 parts

EXAMPLE 31

5.5 parts of 1-amino-4-(3'-sulfamylphenylamino)-anthraquinone-2,8-disulfonic acid was dissolved in 50 parts of concentrated sulfuric acid. To the resulting solution, were added 2.5 parts of N-[4-(β-hydroxyethylsulphonyl)-6-methoxy-3-methylphenyl] urea and 1.0 part of a 30% aqueous formalin solution, and the reaction was effected at 15°–20° C. for 5 hours. The reaction mixture was poured in 250 parts of ice water containing 15% of potassium chloride, and the resulting precipitate was separated by filtration to obtain a wet cake. The wet cake was then suspended in 100 parts of a 15% aqueous potassium chloride solution, the solution was neutralized with soda ash until the pH of the solution was adjusted to 9, and the solution was stirred for 1 hour while maintaining the pH thereof at 9 and was then separated by filtration to obtain a blue dye represented by the following structural formula:

the sodium 1,4 - diamino-2-phenoxy-anthraquinone-3-sulfonate used in Example 29.

| Example Number | Name of anthraquinone derivative used | Amount used, parts | Shade |
|---|---|---|---|
| 39 | 1-amino-4-(2'-methoxyphenylamino)anthraquinone-2-sulfonic acid | 4.2 | Greenish blue. |
| 40 | 1-cyclohexylamino-4-(4'-ethoxyphenylamino)-anthraquinone | 4.1 | Do. |
| 41 | 1,4-bis[4'-(4''-chlorophenoxy)phenylamino]-anthraquinone | 3.2 | Bluish green. |
| 42 | 1-amino-2-phenoxy-4-(2',4',6'-trimethylphenylamino)anthraquinone | 4.4 | Purple. |
| 43 | 1,4-diamino-2,3-bisphenoxyanthraquinone | 2.1 | Reddish purple. |
| 44 | 1,4-diamino-2(4'-methylphenoxy)anthraquinone-3-sulfonic acid | 4.4 | Reddish blue. |

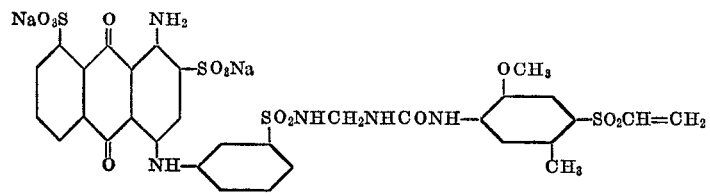

The following examples show the shades of dyes obtained in accordance with the exactly same treatment as in Example 28 except that the following anthraquinone derivatives were respectively used in place of 4.4 parts of the 1-amino-4-(2',4',6'-trimethylphenylamino)anthraquinone-2-sulfonic acid used in Example 28.

The following examples show the shades of the dyes obtained in accordance with the exactly same treatment as in Example 30 except that the following anthraquinone derivatives were respectively used in place of 2.9 parts of the 1,4 - bis[(α - isobutyl-γ-phenyl)propylamino]anthraquinone used in Example 30.

| Example Number | Name of anthraquinone derivative used | Amount used, parts | Shade |
|---|---|---|---|
| 32 | 1-amino-4-[4'-(4''-chlorophenoxy)phenylamino]-anthraquinone-2-sulfonic acid | 5.2 | Blue. |
| 33 | 1-amino-4(2'-methoxyphenylamino)anthraquinone-2,8-disulfonic acid | 5.0 | Greenish blue. |
| 34 | 1-cyclohexylamino-4(2',4',6'-tyimethylphenylamino)anthraquinone-6-sulfonic acid | 5.1 | Blue. |
| 35 | 1,4-bis[(α-methyl-γ-phenyl)propylamino]-anthraquinone-6-sulfonic acid | 3.0 | Greenish blue. |
| 36 | 1,4-bis(4'-methyl-2'-sulfamylphenylamino)-anthraquinone | 2.9 | Bluish green. |
| 37 | 1,4-diamino-2-phenoxyanthraquinone-3-sulfonic | 4.1 | Do. |
| 38 | N-methyl-(2',4'-disulfamylphenylamino)-1,9-anthrapyridone | 2.5 | Red. |

| Example Number | Name of anthraquinone derivative used | Amount used, parts | Shade |
|---|---|---|---|
| 45 | 1-amino-4-(2'.4'.6'-trimethylphenylamino)-anthraquinone-2-sulfonic acid | 4.4 | Reddish blue. |
| 46 | 1,4-bis[(α-methyl-γ-phenyl)propylamino]-5,8-dihydroxyanthraquinone | 2.6 | Greenish blue. |
| 47 | 1,4-bis[(α-methyl-γ-phenyl)propylamino]-6,7-dihydroxyanthraquinone | 2.8 | Do. |
| 48 | 1,4-bis(2'-benzylcyclohexylamino)anthraquinone | 2.9 | Blue. |

The following examples show the shades of dyes obtained in accordance with the exactly same treatment as in Example 29 except that the following antraquinone derivatives were respectively used in place of 4.3 parts of

EXAMPLE 49

6.1 parts of a dye having the structural formula shown in Color Index, Part II. No. 45220 was dissolved in 50 parts of 100% sulfuric acid at a temperature of less than 20° C. To the resulting solution, was added 6.3 parts of the compound represented by the following formula:

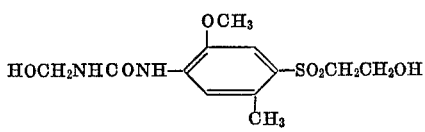

and the reaction was then effected at 60°–65° C. for 10 hours.

The reaction mixture was poured in 250 parts of ice water. To the resulting solution, was added carefully about 50 parts of calcium hydroxide while being cooled with ice to adjust the pH of the solution to 6. The resulting gypsum was separated by filtration. After washing with hot water, the pH of the filtrate was adjusted to 8–9 with soda ash, the filtrate was stirred for 1 hour and was salted out with potassium chloride to obtain a clear bluish red dye represented by the following structural formula:

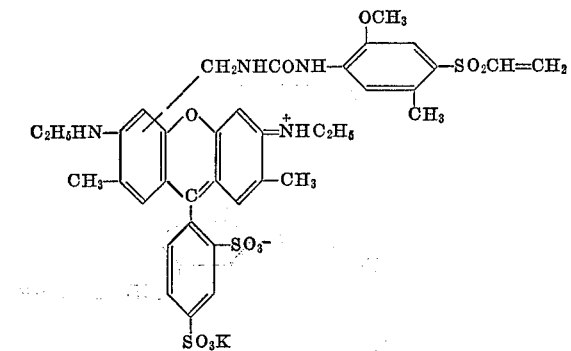

The reaction mixture was poured in 250 parts of ice-water. To the resulting solution, was added carefully about 45 days of calcium hydroxide while being cooled with ice to adjust the pH of the solution to 6. The resulting gypsum was separated by filtration. After washing with hot water, the mother liquor and washing water were combined and concentrated to dryness to obtain a clear bluish red dye represented by the formula,

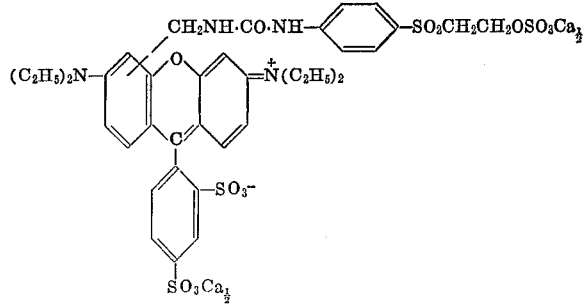

EXAMPLE 51

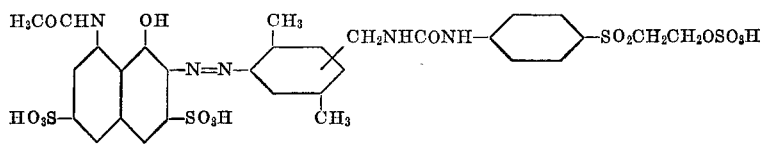

0.3 part of a dye represented the above-identified structural formula was dissolved in 200 parts of water, and after the addition of 10 parts of anhydrous sodium sulfate or sodium chloride thereto, 10 parts of cotton was dipped therein. The resulting mixture was heated to 60° C. Subsequently, to the mixture, were added 2 parts of crystalline trisodium phosphate or 0.2 part of 40° Bé sodium hydroxide and 1 part of sodium carbonate, and subjected to dyeing for 1 hour at that temperature.

After washing with water and soaping, a dyed product of clear bluish red color which was fast to sunlight and washing was obtained.

EXAMPLE 52

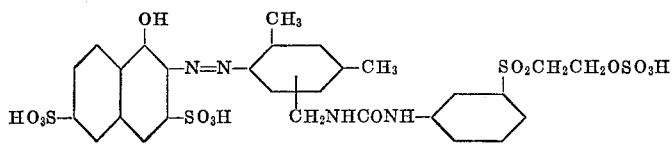

EXAMPLE 50

5.8 parts of a dye having the structural formula shown in Color Index, Part II, No. 45100 was dissolved in 45 parts of 100% sulfuric acid at a temperature of less than 20° C. To the resulting solution, was added 4.9 parts of the compound represented by the formula,

and the reaction mixture was stirred at 20°–25° C. for 3 hours. Thereafter 0.6 part of paraformaldehyde was added to the mixture and the reaction was then effected at 45°–50° C. for 20 hours.

2 parts of a dye represented by the above-identified structural formula, 10 parts of urea and 2 parts of sodium bicarbonate were dissolved in 100 parts of water at a temperature of less than 20° C. Cotton cloth was padded with this solution and was preliminarily dried. The cotton cloth was steamed at 100°–103° C. for 7–10 minutes and then washed with water and soaped to obtain a dyed product of clear bright red color which was fast to sunlight and washing.

EXAMPLE 53

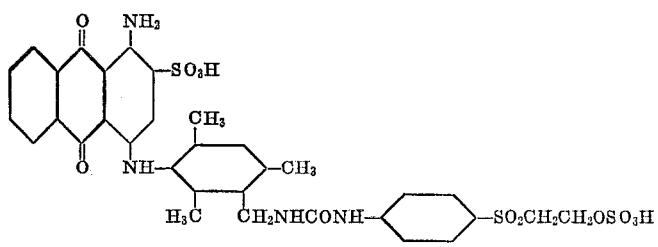

2 parts of a dye represented by the above-identified structural formula, 3 parts of sodium bicarbonate and 5 parts of urea were dissolved in 100 parts of water at a temperature of less than 20° C. Cotton cloth was padded with the aqueous solution thus obtained and was preliminarily dried. The cotton cloth was then heated at 140° C. for 2 minutes, subsequently washed with water and soaped to obtain a dyed product of clear blue color which was fast to sunlight and washing.

EXAMPLE 54

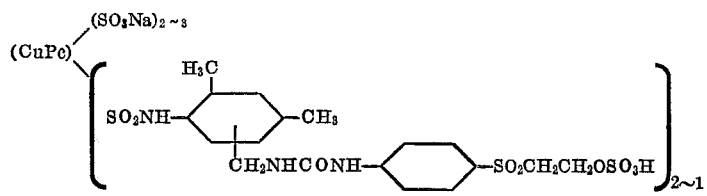

wherein CuPc represents copper phthalocyanine nucleus.

2 parts of a dye represented by the above-identified structural formula, 1 part of trisodium phosphate and 1 part of 40° Bé sodium hydroxide were dissolved in 100 parts of water. Cotton cloth was padded with the aqueous solution thus obtained and was wound up as such. The cotton cloth thus wound up was allowed to stand at 40° C. for 10 hours, and was then washed with water and soaped to obtain a dyed product of clear blue color which was fast to sunlight and washing.

EXAMPLE 55

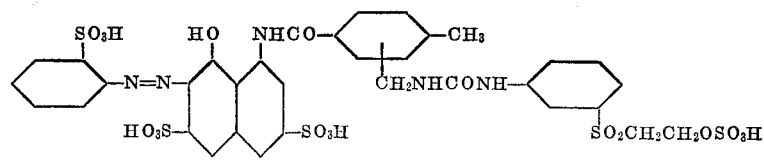

2 parts of a dye represented by the above-identified structural formula was dissolved in 100 parts of water. Cotton cloth was padded with the aqueous solution thus obtained and was preliminarily dried. The cotton cloth was then padded with an aqueous solution containing 20 parts of sodium chloride, and 2 parts of sodium hydroxide dissolved in 100 parts of water. The cotton cloth was then steamed at 100°–103° C. for 20–30 seconds. After washing with water and soaping, a dyed product of clear bluish red color which is fast to sunlight and washing was obtained.

EXAMPLE 56

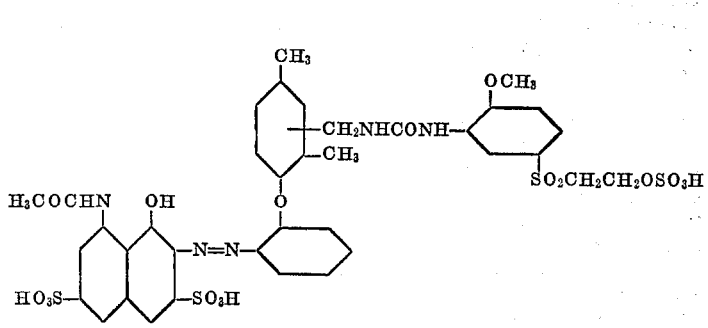

2 parts of a dye represented by the above-identified structural formula was dissolved in 100 parts of water. Cotton cloth was padded with the aqueous solution thus obtained and was preliminarily dried. The cotton cloth was then dipped in an aqueous solution containing 20 parts of sodium carbonate, 10 parts of sodium chloride and 7 parts of 40° Bé sodium hydroxide dissolved in 100 parts of water at 90° C. for 3 seconds.

After washing with water and soaping, a dyed product of clear bluish red color which was fast to sunlight and washing was obtained.

EXAMPLE 57

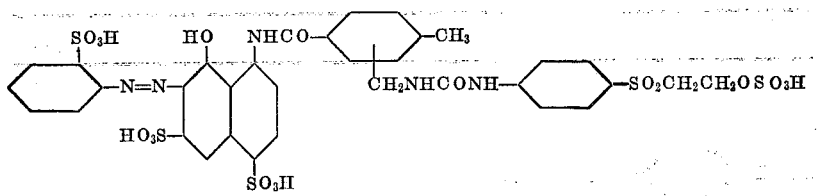

0.5 part of a dye represented by the above-identified structural formula and 5 parts of urea were dissolved in 30 parts of hot water. To the aqueous solution thus obtained, was added 45 parts of sodium alginate paste, and the mixture was made to 100 parts by adjusting the same with water or sodium alginate paste. Cotton cloth was printed with the thus obtained paste and was preliminarily dried. The thus printed cotton cloth was then dipped in 100 parts of an aqueous solution containing 10 parts of sodium chloride, 15 parts of sodium carbonate, 5 parts of potassium carbonate, 5 parts of 40° Bé sodium hydroxide and 1 part of sodium silicate at 95° C. for 10 seconds. After washing with water and soaping, a dyed product of clear red color which was fast to sunlight and washing was obtained.

EXAMPLE 58

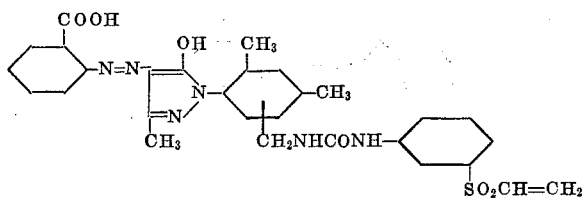

0.2 part of a dye represented by the above-identified structural formula was dissolved in 300 parts of water, to which 3 parts of acetic acid was added. 10 parts of wool was dipped in the thus obtained aqueous solution. The dyeing was initiated at 50° C. and continued at 90°–

TABLE 3

| Ex. No. | Structural formula | Shade |
|---|---|---|
| 59 | | Blue. |
| 60 | | Purple. |
| 61 | | Green. |
| 62 | | Yellow. |

TABLE 3—Continued

| Ex. No. | Structural formula | Shade |
|---|---|---|
| 63 | HO₃S-[naphthalene(OH)(SO₃H)]-N=N-[benzene(CH₃)(CH₃)(CH₃)(CH₂NHCONH-)]-C₆H₄-SO₂CH₂CH₂OSO₃H | Orange. |
| 64 | HO₃S-[naphthalene(OH)(SO₃H)]-N=N-[C₆H₃(OCH₃)(CONHCH₂NHCONH-)]-C₆H₃(OCH₃)(SO₂CH₂CH₂OSO₃H) | Bright red. |
| 65 | [C₆H₄(SO₃H)]-N=N-[naphthalene(HO)(SO₃H)(SO₃H)(NHCONHCH₂NHCONH-)]-C₆H₃(OCH₃)(CH₃)(SO₂CH₂CH₂OSO₃H) | Red. |
| 66 | Cu complex: [C₆H₃(SO₃H)(O-)]-N=N-[naphthalene(O-)(SO₃H)(NHCO-)]-C₆H₃(CH₃)(CH₃)(CH₂NHCONH-)-C₆H₃(COOH)(SO₂CH₂CH₂OSO₃H) | Purplish red. |
| 67 | Cr(H₂O)₂ complex: [naphthalene(HO₃S)(O-)(O₂N)]-N=N-[naphthalene(O-)(HO₃S)(NHCO-)]-C₆H₂(CH₃)(CH₃)(CH₂NHCONH-)-C₆H₄-SO₂CH₂CH₂OSO₃H | Bluish grey. |
| 68 | [Cr complex, 2:1, with two ligands each: [naphthalene(SO₂NHCH₂NHCONH-C₆H₄-SO₂CH=CH₂)(O-)]-N=N-[C₆H₃(Cl)(O-)] ] Na⁺ | Purple. |

TABLE 3—Continued

| Ex. No. | Structural formula | Shade |
|---|---|---|
| 69 | 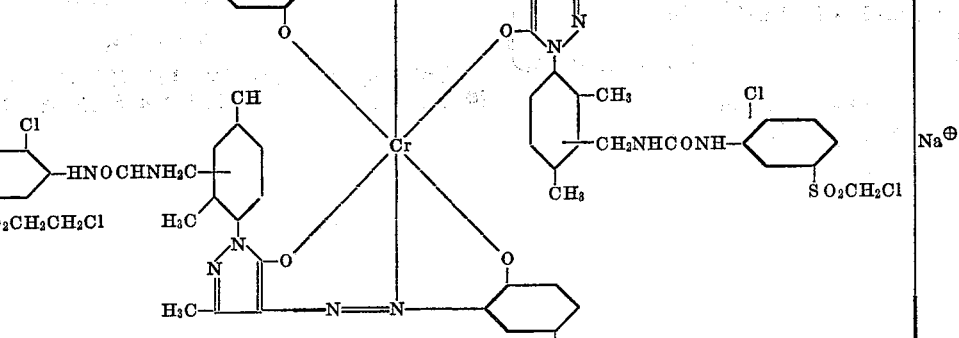 | Yellow. |
| 70 | (CuPc)⟨(SO₃H)₁₋₂ / (SO₂NH₂)₂₋₁ / (SO₂NHCH₂NHCONH—⟨phenyl⟩—SO₂CH₂CH₂OSO₃H)₁₋₂ <br> wherein CuPc represents copper phthalocyanine nucleus | Blue. |
| 71 | 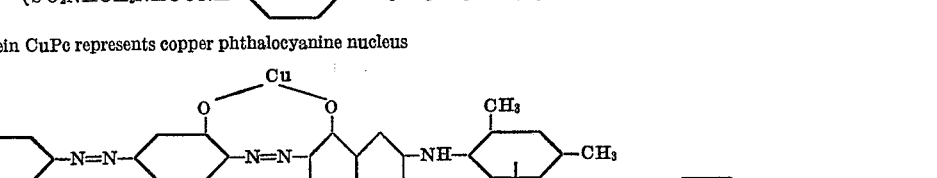 | Greenish grey. |
| 72 | 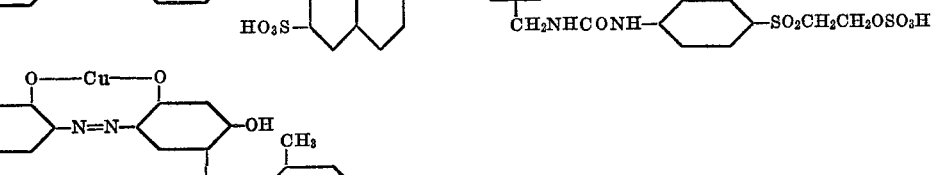 | Yellowish brown. |
| 73 | 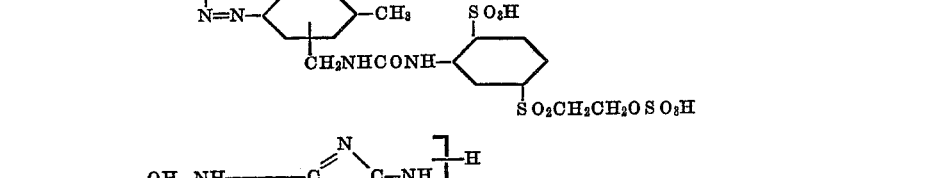 | Red. |

100° C. for 1 hour. Subsequently, the aqueous solution was neutralized with addition thereto of ammonia or hexamethylenetetramine, and the dyeing was further continued for about 30 minutes. After washing with water and soaping, a dyed product of clear yellow color which was fast to sunlight and washing was obtained.

When the processes of Examples 51–58 were applied respectively to the dyes represented by such structural formula as shown in the previous Table 3, the individual dyed products having the shades shown in the table were obtained.

What is claimed is:

1. A phthalocyanine reactive dyestuff of the formula,

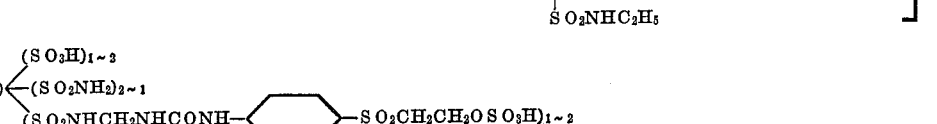

wherein Pc is a copper or nickel phthalocyanine nucleus; $X^1$ and $X^2$ each represent hydrogen, methyl or methoxy; M is hydrogen, an alkali metal or an alkaline earth metal; Y is —$CH_2CH_2OSO_3M$ or —$CH=CH_2$ and the —$SO_2Y$ group is bonded with the phenyl group at a 3- or 4-position to the ureido group; R is hydrogen or

—$CH_2CH_2OSO_3M$

A is —$SO_2NH$— or

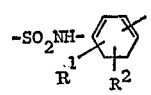

($R^1$ and $R^2$ each represent hydrogen, sulfo, or methyl); $m$ is 0 to 3; $n$ is 0 to 2; and $q$ is 1 to 4, wherein $m+n+q$ is 3 or 4, and when $q$ is 2 to 4, the A's may be the same or different, and —$SO_3M$, —$SO_2NHR$ and —A— groups are all bonded to four phenyl nucleuses in said phthalocyanine at a 3-position, respectively.

2. A phthalocyanine reactive dyestuff of the formula
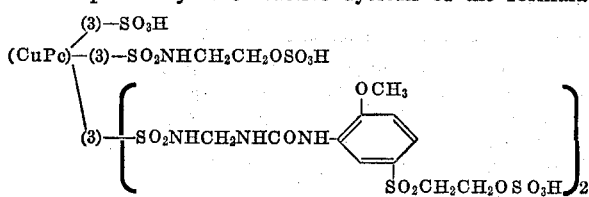
References Cited
UNITED STATES PATENTS
| | | | |
|---|---|---|---|
| 3,969,392 | 1/1961 | Schaeffer | 260—553 X |
| 3,004,035 | 10/1961 | Csendes | 260—553 X |
| 3,125,601 | 3/1964 | Goebel | 260—553 |
| 3,135,730 | 6/1964 | Heyna et al. | 260—190 X |
| 3,261,827 | 7/1966 | Boresch et al. | 260—163 |
| 3,419,542 | 12/1968 | Meininger et al. | 260—195 |
FLOYD D. HIGEL, Primary Examiner
U.S. Cl. X.R.
260—147, 148, 149, 150, 151, 153, 162, 163, 193, 199, 201, 239.6, 314.5, 345.2, 377, 458, 553 A, 578